July 5, 1927.
C. M. HARGRAVE
1,634,830
PROCESS OF MANUFACTURING LAMINATED PRODUCTS
Filed Feb. 17, 1926
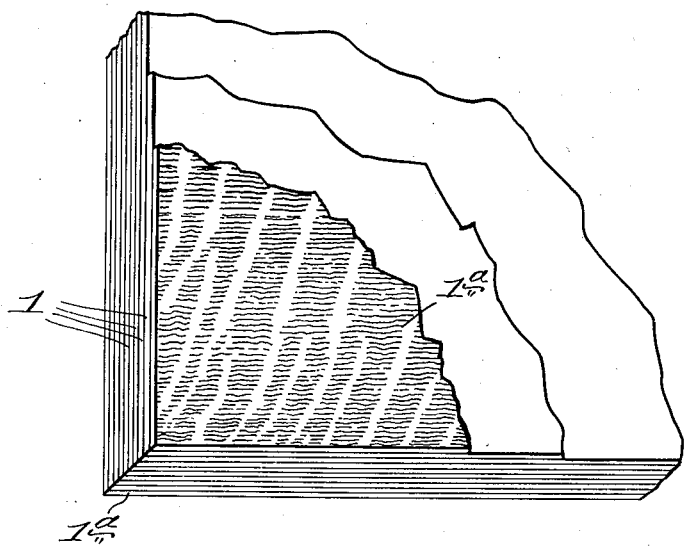
Fig.1.
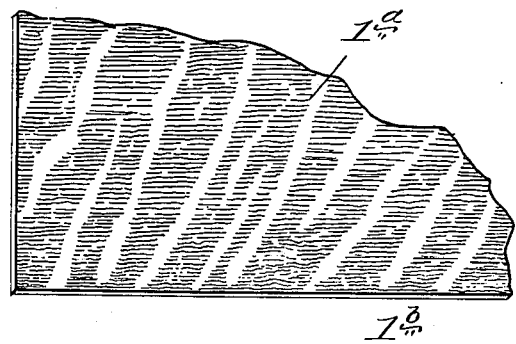
Fig.2.
Fig.3.
Fig.4.
Inventor:
Clarence M. Hargrave,
By Dyrenforth, Lee, Chritton & Wiles,
Attys.

Patented July 5, 1927.

1,634,830

UNITED STATES PATENT OFFICE.

CLARENCE M. HARGRAVE, OF CINCINNATI, OHIO, ASSIGNOR TO THE FORMICA INSULATION COMPANY, OF CINCINNATI, OHIO, A CORPORATION OF OHIO.

PROCESS OF MANUFACTURING LAMINATED PRODUCTS.

Application filed February 17, 1926. Serial No. 88,855.

This invention relates particularly to a process of producing laminated phenolic condensation products. Such laminated products are ordinarily produced by impregnating sheets of fabric, such as paper, or cloth, with a solution of a potentially reactive condensation product; drying the sheets; and placing a stack of the sheets in a heated hydraulic press and consolidating the sheets under heat and pressure, the heat serving to convert the condensation product to its final infusible and substantially insoluble condition.

The phenolic condensation products ordinarily have a yellowish or straw color, and sometimes a reddish or dark reddish color. It has been customary to use the condensation products either in their natural color, or to introduce colored pigments, or pigments darker in color than the natural color of the condensation product. It has heretofore been supposed that it is impossible to lighten the color of phenolic condensation product varnishes. I have discovered that it is possible to lighten these varnishes very much in color, and thus, in connection with other steps, secure effects in the finish of laminated products which hitherto have not been available. I can, for example, by means of the improved process, produce finishes on the surfaces of laminated phenolic condensation products which closely resemble the finishes of light colored woods, such as, for example, oak or mahogany. By means of the improved process, it is possible to produce a finish resembling a fine quarter-sawed oak or mahogany finish.

The invention is of value especially where the laminated product is to enter into cabinet construction, or is to be used for radio panel purposes, or the like.

The following is given as an example:

Impregnate sheets of paper with any well-known phenolic condensation product varnish, such as bakelite varnish or redmanol varnish, and dry the sheets in the usual manner. This paper is used for the body of the panel.

I will now describe the method of preparing the sheets of paper to be used for the surfaces of the completed panel. Mix with 200 pounds of any well-known phenolic condensation product varnish, such as bakelite varnish, or redmanol varnish, about 47½ pounds of titanium oxide white pigment. Where it is desired to impart to the resulting product the characteristic color of a filled and varnished oak piece, this may be accomplished by adding to the varnish just described, 2.5 pounds of iron oxide red pigment. The addition of this pigment may also be advisable in producing mahogany finishes. The sheets of paper to be used for the outer surfaces of a completed panel are then impregnated with this mixture and dried. To attain a grain finish, for example, the outermost sheets of paper may then be printed with suitable designs to produce the desired grained effect. This may be done by applying ink to a suitable grained surface and printing upon the paper. The outermost sheets are finally dipped in clear varnish and dried.

The panel is then built up with the body sheets inside and the surface sheets on the outside and all the sheets consolidated under heat and pressure. If desired, the body of the panel may be made first by consolidating the body sheets under heat and pressure, and the surface or outermost sheets may then be applied and consolidated with the laminated body under heat and pressure.

The consolidation of sheets into the laminated product by heat and pressure as referred to above, may be accomplished by pressing for 45 minutes at about 170° C. under pressure of about 1100 pounds per square inch. The product is then cooled, removed from the press and cut up into panels as desired.

In describing the foregoing process it is to be noted that I have stated that the body sheets are impregnated with varnish not containing pigments; and have stated that such pigments are used only in connection with the outermost or surface sheets. It is to be understood, however, that in some cases it may be advisable to impregnate the body sheets also with a varnish containing such pigments or at least to so impregnate one or more of the outermost sheets of said body sheets. For example, in the event it is desired that the sawed edges of the panel, or the edges of counter-sunk holes shall have substantially the same appearance as the surface of the panel, it is advisable to impregnate the body sheets with varnish containing the same pigments as is used for the outermost sheets. Also, for example, in the event the outermost sheets are thin, or partly transparent, it may be advisable to use the pigments on the sheets immediately underneath, to prevent the darker shades from showing through. Also, for example, in the event there is danger that in the consolidating operation, some of the varnish from the body sheets may be expressed into the surface sheets, it may be advisable, in impregnating the body sheets, particularly the outermost ones, to use a varnish containing the pigments. Also, for example, in making mahogany finishes which are somewhat transparent, it may be advisable to introduce a sheet containing light colored pigments next to the surface mahogany sheet, or to so impregnate all the body sheets. In this way it is possible to make a lighter shade of mahogany than the standard color.

The accompanying drawing illustrates the manner in which the invention may be practiced. In the drawing,—

Fig. 1 represents a broken perspective view of a stack of impregnated, dried sheets of paper, for example, ready to be placed in a press; Fig. 2 represents a broken perspective view of a printed outermost sheet; Fig. 3 represents a broken edge elevational view of the finished laminated product; and Fig. 4 represents a broken perspective view illustrating the manner in which grained surfaces may be produced upon a laminated product after the first consolidation by applying impregnated, printed sheets and consolidating them upon the laminated product to provide the finished surfaces having the grained effect.

It will be understood that according to the illustrations given in Figs. 1, 2 and 3, a stack of dried, impregnated sheets of paper, the two surface sheets being printed with the desired graining or decoration, is placed in a heated press and consolidated with heat and pressure, as explained above. The intermediate sheets are designated 1, the surface sheets are designated 1ª, and the laminated condensation product is designated 1ᵇ.

In Fig. 4, 2 designates a laminated condensation product; and 2ª designates printed surface sheets. The surface sheets are dipped in clear bakelite varnish, dried, and consolidated with the laminated product 2 in a heated hydraulic press.

The varnish which is to be mixed with the pigments may be produced by dissolving the fusible, soluble condensation product in alcohol, for example, or in a mixture of suitable solvents, thus providing a varnish of rather thin consistency. The condensation product should be potentially reactive. That is, it should have incorporated therewith a suitable hardening agent, such as the necessary amount of formaldehyde, hexamethylenetetramine, or other active methylene body, to cause the dissolved resin to be converted into the final infusible and substantially insoluble state under the action of heat.

Variations in proportions and in materials used may be made to enable desired effects to be obtained.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. The process of manufacturing composite laminated phenolic condensation products and providing the same with a decorative surface which comprises: impregnating the fabric with a potentially reactive phenolic condensation product varnish having a light-colored pigment embodied therein, applying to a surface sheet a desired design in ink, dipping the surface sheet in a clear varnish, and consolidating a stack of sheets, including the surface sheet, under heat and pressure.

2. The process of manufacturing a composite laminated phenolic condensation product which comprises: impregnating paper with a phenolic condensation product varnish which is potentially reactive and which contains a suitable proportion of light-colored pigment to produce a light-colored background; consolidating a stack of said sheets under heat and pressure, applying a suitable design or print to a surface sheet, dipping the surface sheet in a clear phenolic condensation product varnish and drying, and consolidating the surface sheet with the previously consolidated stack under heat and pressure.

3. In the process of manufacturing decorated composite materials of the laminated phenolic condensation product type, the steps comprising: adding to a potentially reactive phenolic condensation product varnish, a light-colored pigment to the extent of more than 10% of the weight of the varnish and also a small percentage of a pigment of another color, impregnating fabric with the varnish thus prepared and drying, and consolidating a stack of sheets of said impregnated material under heat and pressure.

4. The process of manufacturing composite laminated phenolic condensation products and providing the same with a decorative surface which comprises: impregnating body sheets with a potentially reactive phenolic condensation product varnish, impregnating a surface sheet with a similar varnish having a light colored pigment embodied therein, applying to the surface sheet a desired design in ink, dipping the surface sheet in a clear varnish, and consolidating a stack of the body sheets with the surface sheet on top, under heat and pressure.

5. In a process of manufacturing a composite laminated phenolic condensation product, the steps which comprise: impregnating surface sheets with a potentially reactive condensation product varnish having incorporated therein a light colored pigment, drying said sheets and printing a design thereon in ink, dipping the printed sheets in a potentially reactive clear phenolic condensation product varnish and drying them, and applying said surface sheets to an intermediate body and consolidating under heat and pressure.

CLARENCE M. HARGRAVE.